(No Model.) 3 Sheets—Sheet 1.

R. MUNROE & R. MUNROE, Jr.
SECTIONAL WATER TUBE BOILER.

No. 565,017. Patented Aug. 4, 1896.

WITNESSES:
C. A. Williams
L. P. Stone

INVENTORS
Robert Munroe
Robert Munroe Jr
BY John H. Roney
ATTORNEY.

(No Model.) 3 Sheets—Sheet 2.
R. MUNROE & R. MUNROE, Jr.
SECTIONAL WATER TUBE BOILER.
No. 565,017. Patented Aug. 4, 1896.
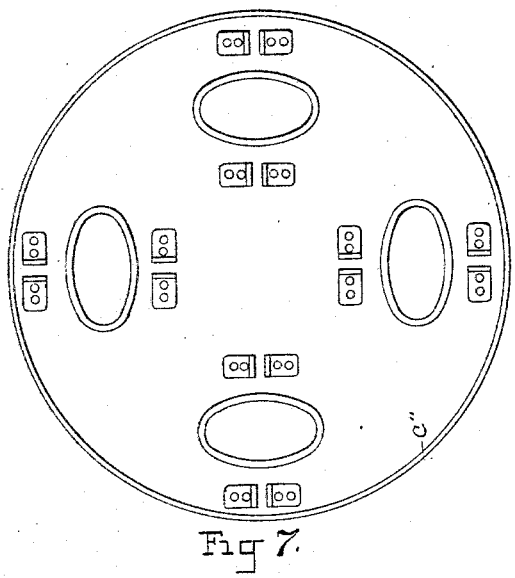
Fig 7.
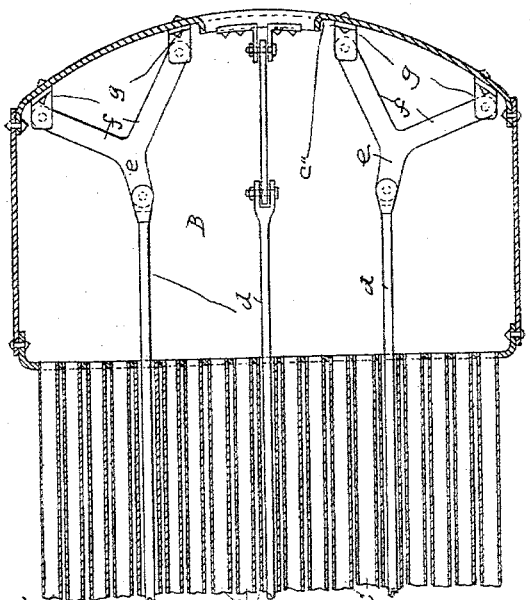
Fig 6.
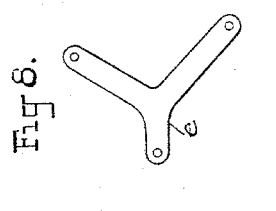
Fig 8.
Fig 9.
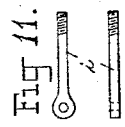
Fig 11.
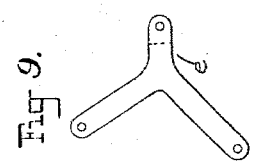
Fig 10.
WITNESSES:
C. A. Williams
L. P. Stone
INVENTORS
Robert Munroe
Robert Munroe Jr
BY John H. Roney
ATTORNEY.

(No Model.) 3 Sheets—Sheet 3.
R. MUNROE & R. MUNROE, Jr.
SECTIONAL WATER TUBE BOILER.
No. 565,017. Patented Aug. 4, 1896.
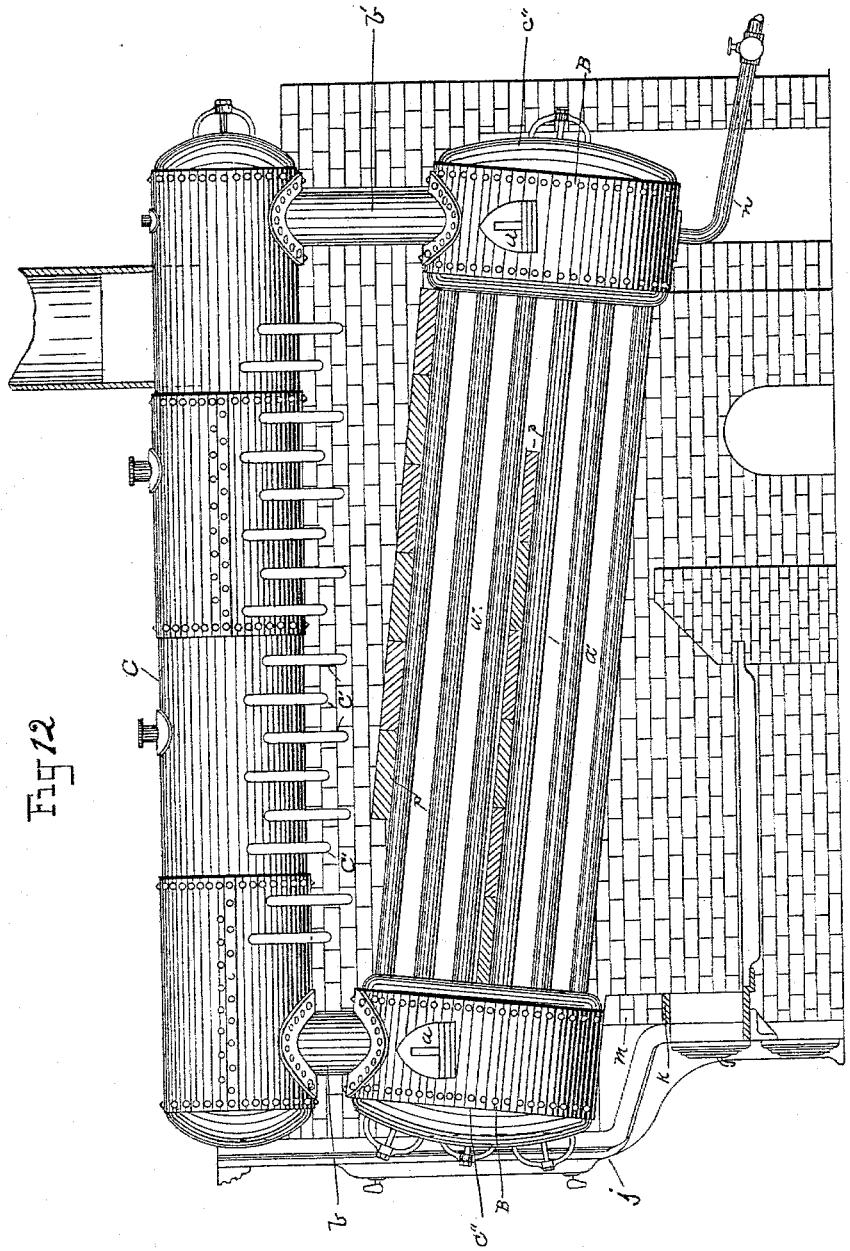
WITNESSES:
C. A. Williams
L. P. Stone
INVENTORS
Robert Munroe
Robert Munroe Jr
BY John H. Roney
ATTORNEY.

UNITED STATES PATENT OFFICE.

ROBERT MUNROE AND ROBERT MUNROE, JR., OF ALLEGHENY, PENNSYLVANIA.

SECTIONAL WATER-TUBE BOILER.

SPECIFICATION forming part of Letters Patent No. 565,017, dated August 4, 1896.

Application filed March 3, 1894. Serial No. 502,254. (No model.)

*To all whom it may concern:*

Be it known that we, ROBERT MUNROE and ROBERT MUNROE, Jr., citizens of the United States, residing at Allegheny, in the county of Allegheny and State of Pennsylvania, have invented certain new and useful Improvements in Sectional Water-Tube Boilers; and we do hereby declare the following to be a full, clear, and exact description of the invention, such as will enable others skilled in the art to which it pertains to make and use the same, reference being had to the accompanying drawings, which form a part of this specification, in which—

Figure 1:
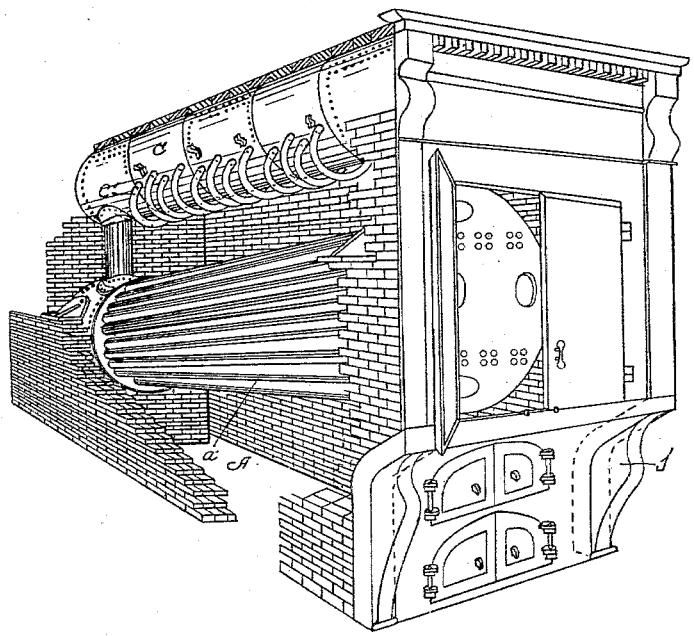
Figure 4:
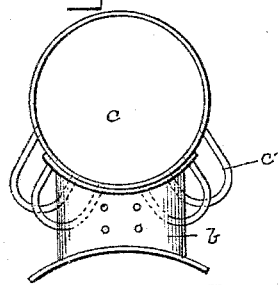
Figure 2:
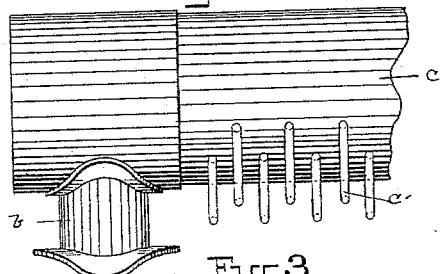
Figure 5:
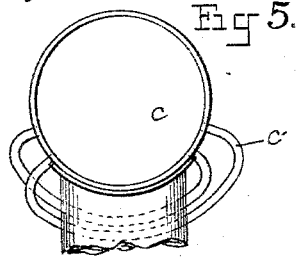
Figure 3:
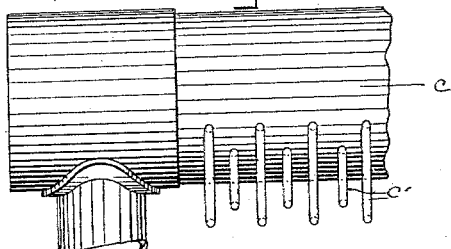

Figure 1 indicates a perspective view (the furnace-wall broken away to show same) of our improved boiler. Figs. 2 and 3 are enlarged details of the forward end of steam-drum and pipe connecting same and boiler-head. Fig. 4 is an end view of same, showing a modified form of circulating-tubes dependent from drum. Fig. 5 is same, showing circulating-tubes passing around the lower side of said drum. Fig. 6 is an enlarged sectional view of heads and tubes, showing brace-rods extending from said front to rear heads. Fig. 7 is a plan view of front head. Figs. 8, 9, 10, and 11 are enlarged details of connecting-rods. Fig. 12 is a side elevation of our improved boiler.

Our invention relates to sectional water-tube boilers, being an improvement upon the boiler covered by Letters Patent No. 478,756, dated March 21, 1892, to Robert Munroe and Robert Munroe, Jr.; and it consists of the novel construction and arrangement of parts hereinafter specifically set forth, reference being had to the accompanying drawings, forming part hereof, in which like letters indicate like parts wherever they occur.

Referring to said drawings, A is a boiler furnace or setting, upon the front and rear walls of which are supported the front and rear heads B B, which are provided with lugs $a\ a$ to admit of this. Said heads are connected by a series of tubes $a'$, the ends of which are suitably secured in the inner wall of said heads, respectively, in staggered rows, as in our previous patent heretofore mentioned. Said heads are respectively connected with the steam-drum $c$ by the vertical pipes $b$ and $b'$, respectively, the pipe $b$ being of less length than the pipe $b'$ to maintain said drum in a horizontal position, as shown, also being elliptical in cross-section to admit of greater area for water circulation and to enable us to so reduce the length of the front head or cylinder as to protect the rear riveted portion of the same from heat or flame. Dependent from and encircling the lower side of said drum are a series of tubes $c'$, the upper rows of which are attached to said drum at or above the water-line and the lower series below the same, for the purpose of producing water circulation in said drum and increasing the efficiency of the boiler for generating steam. Said tubes, instead of encircling the under side of said drum, may be attached to and project downwardly from the lower side of the same, as shown in Fig. 4. The front wall or plate $a''$ of said tube-heads B B are braced by a number of rods $d\ d$, the rear ends of which are pivotally attached to the Y-shaped brace $e$, the arms or members $f$ of which are likewise pivotally secured upon lugs $g$, bolted or otherwise secured to said head. The front ends of said rods are threaded and secured in the turnbuckles $h\ h$, the opposite ends of said turnbuckles being attached to short rods $i\ i$, which are attached to similar braces $e$, similarly secured to the front head as those secured to the rear head, the purpose of this arrangement being to adjust the strain of the brace-rods proportionally with the strain on the heads by the outward pressure of the steam and to enable the removal of said brace-rods for the purpose of cleaning said tubes, or for other reasons that may require the removal of same, the Y-shaped members being so shaped as to enable easy access to said heads for such purpose.

The lower part of the boiler-front $j$ is projected inwardly and supports a liner $k$, upon which the transverse wall $m$ is constructed. Said wall extends beyond the inner end of the front head to protect the same from the flame, and more especially to protect the rivets securing the inner sheet to the shell of said head from the action of the flame. The rear head is provided with the influent-pipe $n$.

$p\ p$ are tile for the purpose of directing the flame in said furnace.

Having described our invention, what we claim, and desire to secure by Letters Patent, is—

1. In a sectional water-boiler, the combination of the front and rear heads, tube-sheets forming the rear walls of said heads, being provided with a series of orifices; a series of tubes suitably secured in said orifices and connecting said heads, and a series of removable brace-rods extending from head to head and provided with turnbuckles to regulate the strain of said rods on said heads; and a steam-drum connected with said tube chambers or heads, by vertical pipes; the pipe connecting said drum with the forward tube chamber or head, being elliptical or oblong in cross-section, as to admit of an orifice of great extent being formed in a comparatively short chamber or head, substantially as and for the purpose set forth.

2. In a sectional water-tube boiler, the combination of the front and rear heads, tube-sheets forming the rear walls of said heads, being provided with a series of orifices; a series of tubes suitably secured in said orifices, and connecting said heads, and a series of removable brace-rods, provided with turnbuckles, and a series of Y-braces to regulate the strain on said heads; a steam-drum connected with said chambers by legs the front one of which is elliptical or oblong in cross-section; and a series of circulating-tubes dependent from or encircling the under side of said drum, the upper rows of which are attached at or above the water-line therein, and the lower row below the same, substantially as and for the purpose described.

In testimony that we claim the foregoing we hereunto affix our signatures this 23d day of February, A. D. 1894.

ROBERT MUNROE. [L. S.]
ROBERT MUNROE, Jr. [L. S.]

In presence of—
JAS. J. McAFEE,
C. A. WILLIAMS.